US012151504B2

(12) United States Patent
Kim

(10) Patent No.: US 12,151,504 B2
(45) Date of Patent: Nov. 26, 2024

(54) MULTI-PEN HAVING SHARP KNOB CONTAINING A THROUGH HOLE FOR SHARP LEAD

(71) Applicant: LIVEWORK Co., Ltd, Seoul (KR)

(72) Inventor: Pill Won Kim, Seoul (KR)

(73) Assignee: LIVEWORK CO., LTD., Seoul (KR)

( * ) Notice: Subject to any disclaimer, the term of this patent is extended or adjusted under 35 U.S.C. 154(b) by 0 days.

(21) Appl. No.: 18/358,901

(22) Filed: Jul. 25, 2023

(65) Prior Publication Data

US 2024/0001707 A1 Jan. 4, 2024

(30) Foreign Application Priority Data

Jul. 29, 2022 (KR) ........................ 10-2022-0094748
Jun. 30, 2023 (KR) ........................ 10-2023-0084678

(51) Int. Cl.

*B43K 24/12* (2006.01)
*B43K 21/06* (2006.01)
*B43K 24/10* (2006.01)
*B43K 24/16* (2006.01)

(52) U.S. Cl.

CPC .............. *B43K 24/12* (2013.01); *B43K 21/06* (2013.01); *B43K 24/10* (2013.01); *B43K 24/163* (2013.01)

(58) Field of Classification Search

CPC ........ B43K 24/12; B43K 21/06; B43K 24/10; B43K 24/16; B43K 24/163; B43K 24/183; B43K 24/00; B43K 21/00; B43K 21/02; B43K 21/027
USPC .......................................... 401/29–33, 92–94
See application file for complete search history.

(56) References Cited

U.S. PATENT DOCUMENTS 3,103,205 A * 9/1963 Legnani ................. B43K 24/10 D19/906
4,165,941 A * 8/1979 Kageyama ............. B43K 24/16 401/67
4,968,167 A * 11/1990 Kageyama ............. B43K 27/02 401/109

* cited by examiner

*Primary Examiner* — David J Walczak

(57) ABSTRACT

A multi-pen includes: an upper body; a lower body detachably coupled to a lower side of the upper body; at least one ink lead and a sharp pipe accommodated in the upper body and the lower body; a sharp knob coupled to an upper side of the sharp pipe and having a through hole formed therein; a cover detachably provided at an upper side of the sharp knob; and a sharp exposure part exposed to the outside of the lower body according to an operation of the sharp knob, wherein a sharp lead is supplied to the sharp pipe from the upper side of the sharp knob through the through hole.

6 Claims, 6 Drawing Sheets

MULTI-PEN HAVING SHARP KNOB CONTAINING A THROUGH HOLE FOR SHARP LEAD

CROSS-REFERENCE TO RELATED APPLICATION

This application claims priority under 35 U.S.C. § 119(a) to the Korean Patent Application No. 10-2022-0094748, filed on Jul. 29, 2022, and the Korean Patent Application No. 10-2023-0084678, filed Jun. 30, 2023, the entire contents of which are incorporated herein by reference.

BACKGROUND

(a) Technical Field

The present disclosure relates to a multi-pen, and more particularly, to a multi-pen capable of conveniently supplying pencil leads in a multi-pen provided with a sharp pencil.

(b) Background Art

In general, a multi-pen is a ballpoint pen in which several colored ink leads are bundled into one pen, and recently, a product bundled with a sharp pencil together also has been released.

FIGS. 1 and 2 are diagrams showing a configuration of a multi-pen having a sharp pencil according to the related art.

As shown in FIGS. 1 and 2, a conventional multi-pen may include a body part 100 accommodating a sharp pencil and one or more ballpoint pens, a pencil knob 102 for exposing pencil leads to the outside, a plurality of ballpoint pen knobs 104 for exposing one or more ink leads to the outside, and a cover part 106 separated from the body part 100.

Referring to FIG. 2, in the conventional multi-pen having the sharp pencil, a pencil pipe 112 accommodating a pencil lead 110 and a pencil exposure part 114 coupled to the lower side of the pencil pipe 112 are provided, and the pencil knob 102 is fitted to the upper side of the pencil pipe 112.

Conventionally, after the body part 100 and the cover part 106 are separated from each other in order to supplement the pencil leads, the pencil pipe 112 and the pencil exposure part 114 coupled to the lower side are separated from each other, and then the pencil lead 110 needs to be added to the lower side of the pencil pipe 112, and thus, there is a very cumbersome problem.

SUMMARY OF THE DISCLOSURE

In order to solve the problems of the related art, the present disclosure provides a multi-pen capable of increasing the convenience of supplying pencil leads.

To achieve the above object, according to an embodiment of the present disclosure, there is provided a multi-pen including: an upper body; a lower body detachably coupled to a lower side of the upper body; at least one ink lead and a pencil pipe accommodated in the upper body and the lower body; a pencil knob coupled to an upper side of the pencil pipe and having a first through hole formed therein; a cover detachably provided at an upper side of the pencil knob; and a pencil exposure part exposed to the outside of the lower body according to an operation of the pencil knob, in which a pencil lead is supplied to the pencil pipe from the upper side of the pencil knob through the first through hole.

An extension direction of the first through hole may be formed in the same direction as the extension direction of the pencil pipe.

An inner diameter of the first through hole may have a size equal to or larger than an outer diameter of the pencil pipe.

The first through hole may have a round shape with a predetermined diameter.

The pencil knob may be formed of a transparent material, and a pattern may be displayed on the outside so that an image displayed on the outside varies according to a length of the pencil lead inserted therein.

A second through hole through which the pencil lead passes may be formed inside the cover, and a lower diameter of the second through hole may be formed to have a size smaller than an upper diameter thereof.

According to the present disclosure, since the cover of the pencil knob formed on the upper side of the body may be opened to supply the pencil leads, it is possible to increase convenience in supplying the pencil leads.

DETAILED DESCRIPTION

Figure 1:
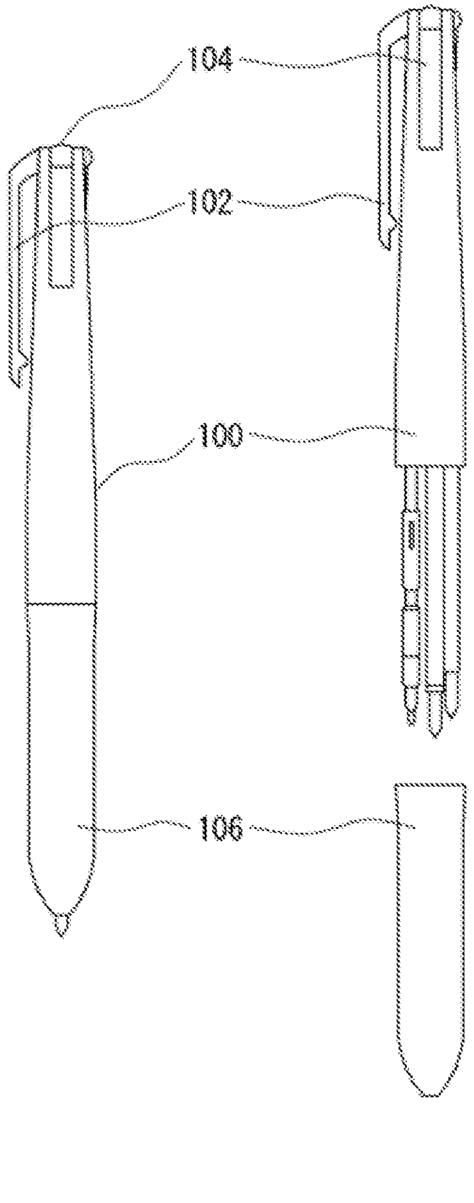
FIG. 1 (Prior Art)
FIGS. 1 and 2 are diagrams showing a configuration of a multi-pen having a sharp pencil according to the related art.
Figure 2:
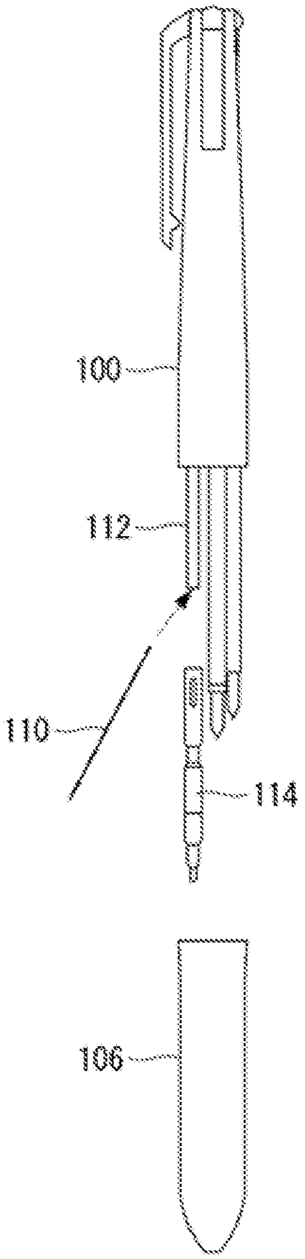
FIG. 2 (Prior Art)

Since the present disclosure may be variously modified and have several embodiments, specific embodiments will be illustrated in the accompanying drawings and be described in detail in a detailed description. However, it is to be understood that the present disclosure is not limited to a specific embodiment, but includes all modifications, equivalents, and substitutions included within the spirit and technical scope of the present disclosure.

The terms used in the present specification are used only to describe specific embodiments, and are not intended to limit the present disclosure. Singular forms include plural forms unless the context clearly indicates otherwise. It should be understood that the terms "include" or "have" used in the present specification specify the presence of features, numerals, steps, operations, components, parts described in the specification, or combinations thereof, but do not preclude the presence or addition of one or more other features, numerals, steps, operations, components, parts, or combinations thereof.

In addition, components of the embodiments described with reference to each drawing are not limitedly applied only to the corresponding embodiment, and may be implemented to be included in other embodiments within the scope of maintaining the technical spirit of the present disclosure. In addition, it goes without saying that these components may also be re-implemented as one embodiment in which a plurality of embodiments are integrated, even if a separate description is omitted.

In addition, in the description with reference to the accompanying drawings, regardless of reference numerals, the same components will be given the same or related reference numerals and duplicate description thereof will be omitted. When it is decided that the detailed description of the known art related to the present disclosure may unnecessarily obscure the gist of the present disclosure, a detailed description therefor will be omitted.

Figure 3:
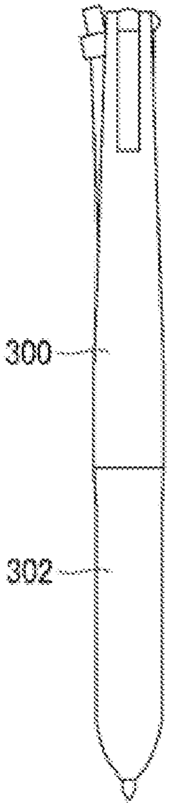
FIGS. 3 to 5 are diagrams showing a configuration of a multi-pen having a sharp pencil according to an embodiment of present disclosure.
Figure 4:
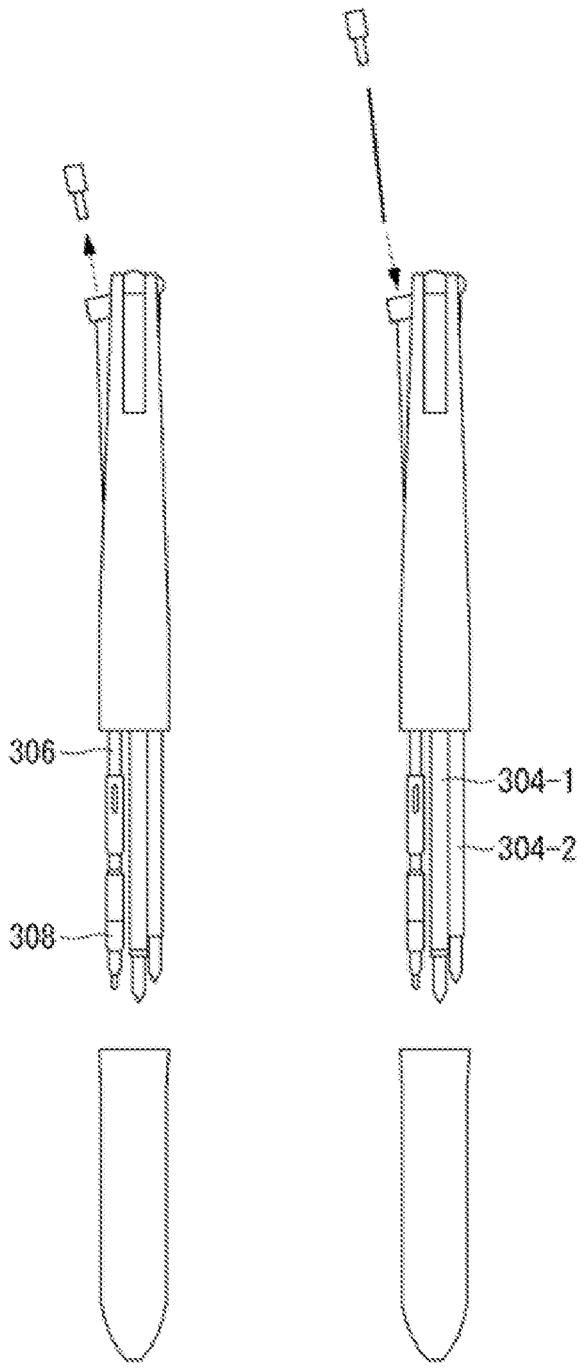
Figure 5:
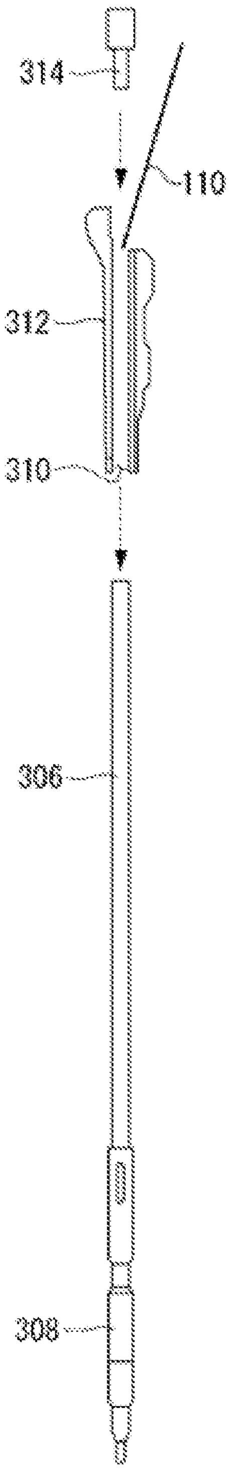

FIGS. 3 to 5 are diagrams showing a configuration of a multi-pen having a sharp pencil according to an embodiment of present disclosure.

As shown in FIGS. 3 to 5, the multi-pen according to the embodiment may include an upper body 300, a lower body 302, a pencil pipe 306, one or more ink leads 304-1 and 304-2, pencil leads accommodated in the upper body 300 and the lower body 302, and a pencil exposure part 308.

According to the embodiment, a pencil knob 312 having a first through hole 310 is coupled to the upper side of the pencil pipe 306, and a detachable cover 314 is provided on the upper side of the pencil knob 312.

When a clip for easily mounting the multi-pen is provided on the side of the upper body 300, the pencil knob 312 according to the embodiment may also be integrally formed with the clip.

Preferably, an extension direction of the first through hole 310 according to the embodiment may be the same as the extension direction of the pencil pipe 306, but is not limited thereto, and the first through hole 310 may have a round shape having a predetermined diameter (more than a preset diameter) in a direction from top to bottom.

At this time, it is preferable that the first through hole 310 is formed in the same direction as the extension direction of the pencil pipe 306 from the upper side to the lower side of the first through hole 310.

Thus, even when the cover 314 forms a predetermined angle with the upper body 300 as in FIG. 3, the pencil lead to be supplied through the first through hole 310 may move toward the pencil pipe 306 while having a diameter enough to prevent the pencil lead from being broken.

In addition, an inner diameter of the first through hole 310 has a size equal to or larger than an outer diameter of the pencil pipe 306 so that the pencil knob 312 and the pencil pipe 306 are tightly fitted.

According to the embodiment, the lower end of the first through hole 310 is fitted while surrounding the upper side of the pencil pipe 306, and the pencil lead to be supplied from the upper side of the first through hole 310 is accommodated in the pencil pipe 306 according to the gravity.

The pencil knob 312 according to the embodiment not only serves to expose the pencil exposure part 308 to the outside of the lower body 302 according to the user's operation, but also serves as a pencil lead supply passage while having the first through hole 310, thereby further improving the user's operation and the convenience of supplying the pencil lead.

Accordingly, it is possible to increase convenience of supplying the pencil lead by supplying the pencil lead through a simple process without separating the upper body and the lower body, and separating the pipe and the pencil exposure part as in the related art.

Figure 6:
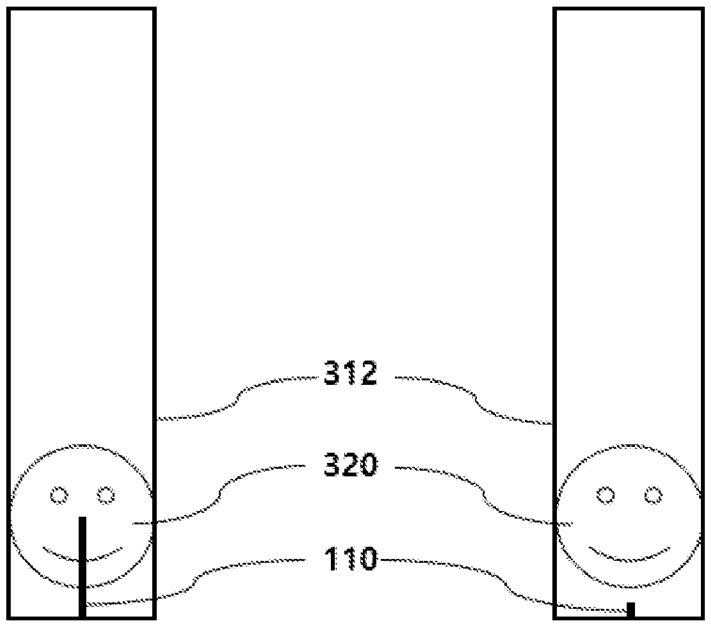
FIG. 6 is a diagram showing a shape of an outer side of the pencil knob according to an embodiment of present disclosure.

FIG. 6 is a diagram showing a shape of an outer side of the pencil knob according to an embodiment of present disclosure.

According to the embodiment, considering the fact that it is difficult to check the number or length of the pencil lead inside the pencil pipe 306 due to the characteristics of the multi-pen, the pencil knob 312 may be formed of a transparent material, and a predetermined pattern 320 may be formed on the outside.

As shown in FIG. 6, a predetermined pattern is displayed on the outer side of the pencil knob 312 formed of a transparent material, and if an image varies according to the number or length of the pencil lead 110, the user may easily determine whether or not to supply the pencil lead 110.

Figure 7:
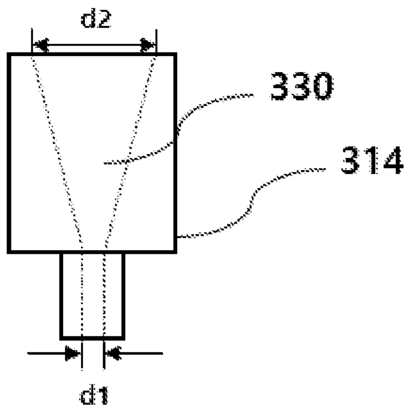
FIG. 7 is a diagram showing a cross section of a cover according to an embodiment of present disclosure.

FIG. 7 is a diagram showing a cross section of a cover according to an embodiment of present disclosure.

Referring to FIG. 7, a second through hole 330 through which the pencil lead 110 passes is formed inside the cover 314.

As such, the forming of the second through hole 330 in the cover 314 is to supply the pencil lead through the cover 314 toward the pencil knob 312 and the pencil pipe 306 without an operation of removing the cover 314.

At this time, it is preferred that a lower diameter d1 of the cover 314 is formed to have a size smaller than an upper diameter d2 thereof so as to prevent the pencil lead in the pencil pipe 306 from being exposed to the outside depending on a position of the multi-pen. The embodiments of the present disclosure described above have been disclosed for illustrative purposes, and those skilled in the art with ordinary knowledge of the present disclosure will be able to make various modifications, changes, and additions within the spirit and scope of the present disclosure, and these modifications, changes, and additions should be regarded as falling within the scope of the following claims.

What is claimed is:

1. A multi-pen comprising:
an upper body;
a lower body detachably coupled to a lower side of the upper body;
one or more ink leads and a pencil pipe accommodated in the upper body and the lower body;
a pencil knob coupled to an upper side of the pencil pipe and having a first through hole formed therein;
a cover detachably provided at the upper side of the pencil knob; and
a pencil exposure part exposed to an outside of the lower body according to an operation of the pencil knob,
wherein a pencil lead is supplied to the pencil pipe from an upper side of the pencil knob through the first through hole,
wherein a second through hole through which the pencil lead passes is formed inside the cover, and a lower diameter of the second through hole is smaller than an upper diameter thereof.

2. The multi-pen of claim 1, wherein an extension direction of the first through hole is formed in the same direction as an extension direction of the pencil pipe.

3. The multi-pen of claim 2, wherein an inner diameter of the first through hole has a size equal to or larger than an outer diameter of the pencil pipe so that the pencil knob and the pencil pipe are tightly fitted.

4. The multi-pen of claim 1, wherein the first through hole has a round shape with a predetermined diameter.

5. The multi-pen of claim 4, wherein the first through hole is formed in the same direction as an extension direction of the pencil pipe from an upper side to a lower end of the through hole.

6. The multi-pen of claim 1, wherein the pencil knob is formed of a transparent material, and a pattern is displayed on outside so that an image displayed on the outside varies according to a length of the pencil lead inserted therein.

* * * * *